US007882686B2

(12) United States Patent
Bryan, Jr. et al.

(10) Patent No.: US 7,882,686 B2
(45) Date of Patent: Feb. 8, 2011

(54) MOBILE SYSTEM FOR IMPROVING THE PICKING AND PRELIMINARY PROCESSING OF APPLES, CITRUS, STONE FRUIT AND LIKE OBJECTS

(75) Inventors: Vincent E. Bryan, Jr., Quincy, WA (US); Vincent E. Bryan, III, Mercer Island, WA (US); Alex E. Kunzler, Issaquah, WA (US); Randy Allard, Issaquah, WA (US); Anthony Finazzo, Mercer Island, WA (US); Marc Bommarito, Mercer Island, WA (US); Jeffrey A. Cleveringa, Ephrata, WA (US)

(73) Assignee: Picker Technologies LLC, Mercer Island, WA (US)

( * ) Notice: Subject to any disclaimer, the term of this patent is extended or adjusted under 35 U.S.C. 154(b) by 101 days.

(21) Appl. No.: 12/371,446

(22) Filed: Feb. 13, 2009

(65) Prior Publication Data

US 2010/0037583 A1 Feb. 18, 2010

Related U.S. Application Data

(60) Provisional application No. 61/028,351, filed on Feb. 13, 2008, provisional application No. 61/095,788, filed on Sep. 10, 2008.

(51) Int. Cl.
*A01D 46/00* (2006.01)
(52) U.S. Cl. .................. 56/328.1; 56/13.1; 414/503
(58) Field of Classification Search ................ 414/373, 414/503, 508; 406/39–44, 151; 56/12.8, 56/12.9, 13.1, 13.2, 16.6, 334, 336, 340, 56/328.1
See application file for complete search history.

(56) References Cited

U.S. PATENT DOCUMENTS

| | | | | | |
|---|---|---|---|---|---|
| 2,474,557 | A | * | 6/1949 | Templeton | 56/122 |
| 2,821,312 | A | * | 1/1958 | Wiegel | 414/508 |
| 3,182,827 | A | * | 5/1965 | Dahle | 414/508 |
| 3,190,466 | A | * | 6/1965 | Hostetier | 414/788.8 |
| 3,523,404 | A | * | 8/1970 | Girardi | 53/391 |
| 3,641,738 | A | * | 2/1972 | Johnson | 53/391 |
| 3,714,768 | A | * | 2/1973 | Patterson | 56/328.1 |
| 3,910,439 | A | * | 10/1975 | Ross et al. | 414/503 |
| 4,532,757 | A | * | 8/1985 | Tutle | 56/328.1 |
| 4,558,561 | A | * | 12/1985 | Mendenhall | 56/328.1 |
| 7,669,398 | B1 | * | 3/2010 | King et al. | 56/328.1 |
| 2004/0130714 | A1 | * | 7/2004 | Gellerman et al. | 356/300 |
| 2005/0172595 | A1 | * | 8/2005 | Wells et al. | 56/13.1 |

* cited by examiner

*Primary Examiner*—Saúl J Rodriguez
*Assistant Examiner*—Stephen Vu
(74) *Attorney, Agent, or Firm*—Hughes Socol Piers Resnick and Dym Ltd.; Todd S. Parkhurst

(57) ABSTRACT

A mobile system for improving the picking and preliminary processing of apples, citrus, stone fruit and the like is disclosed and claimed. The system comprises a mobile chassis upon which can be mounted picking stations, pneumatic tube transport subsystems, receiving and conveying subsystems, object scanning subsystems, cull diverter subsystems, labeling subsystems, and subsystems for relatively gently placing the objects in a predetermined location in a receiving bin. The system can also include a subsystem for gently placing diverted objects in a receiving bin.

11 Claims, 2 Drawing Sheets

US 7,882,686 B2

MOBILE SYSTEM FOR IMPROVING THE PICKING AND PRELIMINARY PROCESSING OF APPLES, CITRUS, STONE FRUIT AND LIKE OBJECTS

This patent application claims priority from Vincent E. Bryan, Jr. et al. U.S. provisional patent application Ser. No. 61/028,351 filed Feb. 13, 2008 and entitled "Mobile System for Improving the Picking and Preliminary Processing of Apples, Citrus, Stone Fruit and Like Objects" and Vincent E. Bryan, Jr. et al. U.S. provisional patent application Ser. No. 61/095,788 filed Sep. 10, 2008 and entitled "Harvesting System For Citrus Fruits And The Like," both of which are incorporated herein by reference.

BACKGROUND OF THE INVENTION

Presently in the fruit industry, more specifically in the apple industry, fruit is traditionally handpicked. The pickers carefully pick selected fruit and place the picked fruit in apple bags which are worn on the shoulders of the pickers, and which extend downward over the chest and abdomen to the groin. The pickers then gently release the bagged fruit into large bins for later transport to a packing or processing plant. This technique provides for the pickers to select the desired fruit "on-tree" by utilizing the visually discernible criteria of color, size and quality.

Good pickers remove the fruit from the tree while keeping the stem intact on the fruit so as to maintain the integrity of the following years' fruiting bud on the tree. On occasion, the picking operations must contend with the clipping of overly stiff or long stems; the gentle placement of the fruit into the picking bag to prevent bruising; and the transfer and delivery of the fruit to a larger size container, better adapted for truck transport. Fruit located on high limbs may require that the picker climb a ladder or stand on a scaffold to reach the fruit. The fruit bins are usually placed in the row between tree lines and spaced so that they can be filled by apples transferred from the picker's bag within the shortest walking distance. The bins are then picked up by an apple trailer pulled by a tractor and taken to a common holding site awaiting forklift placement onto a flatbed truck.

This fruit picking process results in about 30% of the pickers time actually picking fruit, with the remaining 70% of the time is spent gently placing the fruit into bags or bins after having clipped the stems when required, moving and climbing up and down letters, carrying fruit from one place to another, then walking and carefully releasing the picker bag load of apples into the collecting bin, taking special care not to cause a blemish or bruise on the fruit by rough handling. The picker bag load may weigh 40 pounds or more leading to fatigue of the picker and a reduction in efficiency.

Due to the seasonal nature of the fruit harvest, fruit pickers are frequently migrant workers, often from other countries. As a result of increasingly stringent immigration policies, a sufficient numbers of pickers may not be available to pick the fruit at harvest time. Due to the slowness of the fruit hand-picking process, large numbers of pickers are required when the fruit reaches the proper point of ripeness. Since individual productivity is low when fruit is handpicked, wages remain low for the individual picker. This results in the propagation of a population of below average wage earners.

Thus it is an object of this invention to provide a mechanized system for improving the productivity of the individual picker while maintaining the advantages of the hand picking process namely, selectivity of fruit to be picked, gentleness to prevent bruising at all stages of movement and packing.

It is another object of the invention to provide this mechanized system in a mobile form.

It is yet another object to provide an optional mechanized system which will identify and divert so-called culls which consist of bruised, infested or otherwise unacceptable fruit or like objects.

Other objects and advantages of the invention will become apparent upon reading the following detailed description and upon reference to the drawings. Throughout the drawings, like reference numbers refer to like parts.

SUMMARY OF THE INVENTION

A mobile system for improving the picking and preliminary processing of apples, citrus, stone fruit and the like is disclosed and claimed. The system comprises a mobile chassis upon which can be mounted picking stations, pneumatic tube transport subsystems, optional object scanning subsystems, optional cull diverter subsystems, optional labeling subsystems, and subsystems for relatively gently placing the unculled objects in a receiving bin. The system can also include a subsystem for placing diverted objects in a receiving bin.

DETAILED DESCRIPTION

While the invention will be described in connection with a preferred embodiment and procedure, it will be understood that it is not intended to limit the invention to this embodiment or procedure. On the contrary, it is intended to cover all alternatives, modifications and equivalents as may be included within the spirit and scope of the invention.

Figure 1:
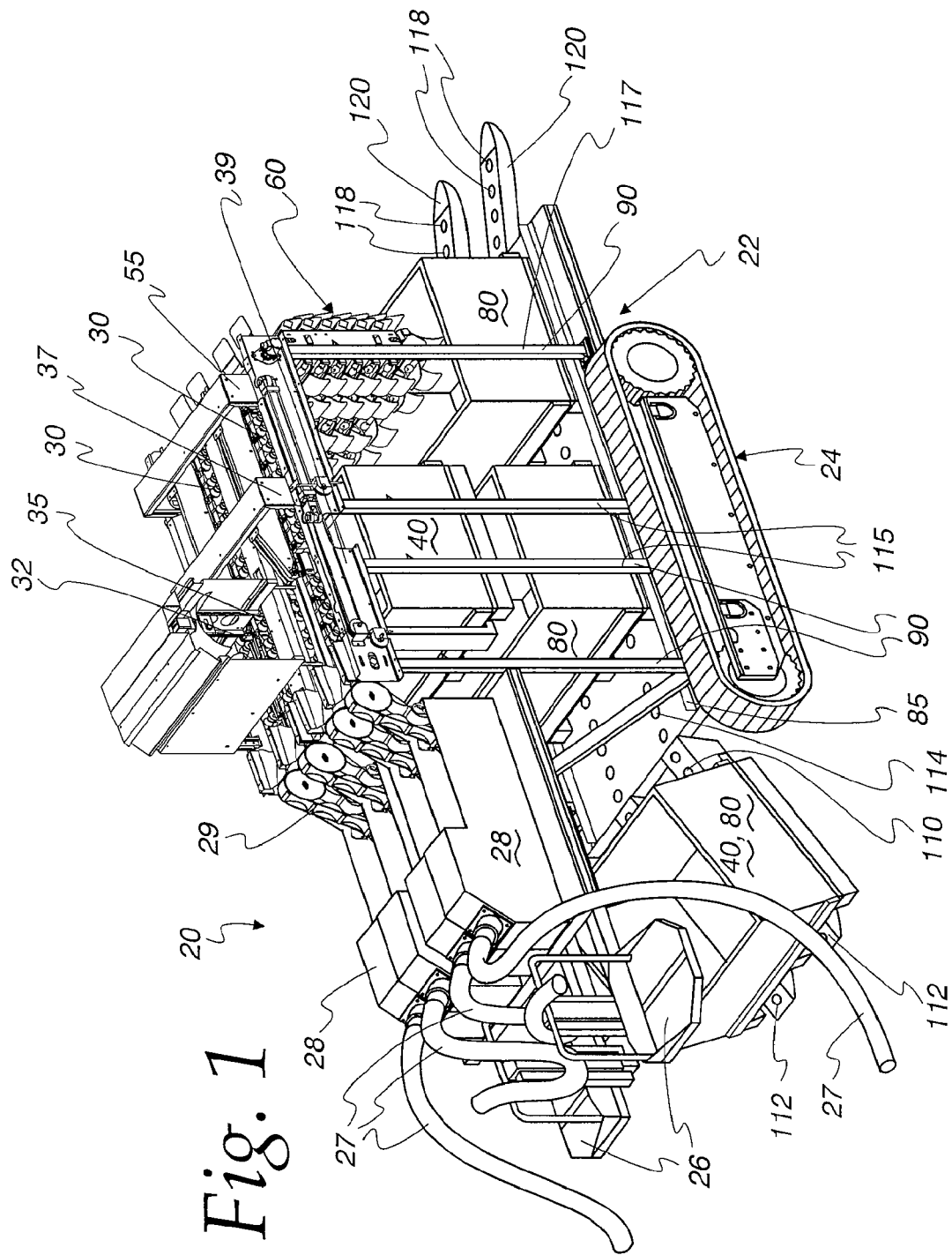
FIG. 1 is an isometric drawing of a mobile picking system embodying the invention showing the embodiment in its front and side aspects.
Figure 2:
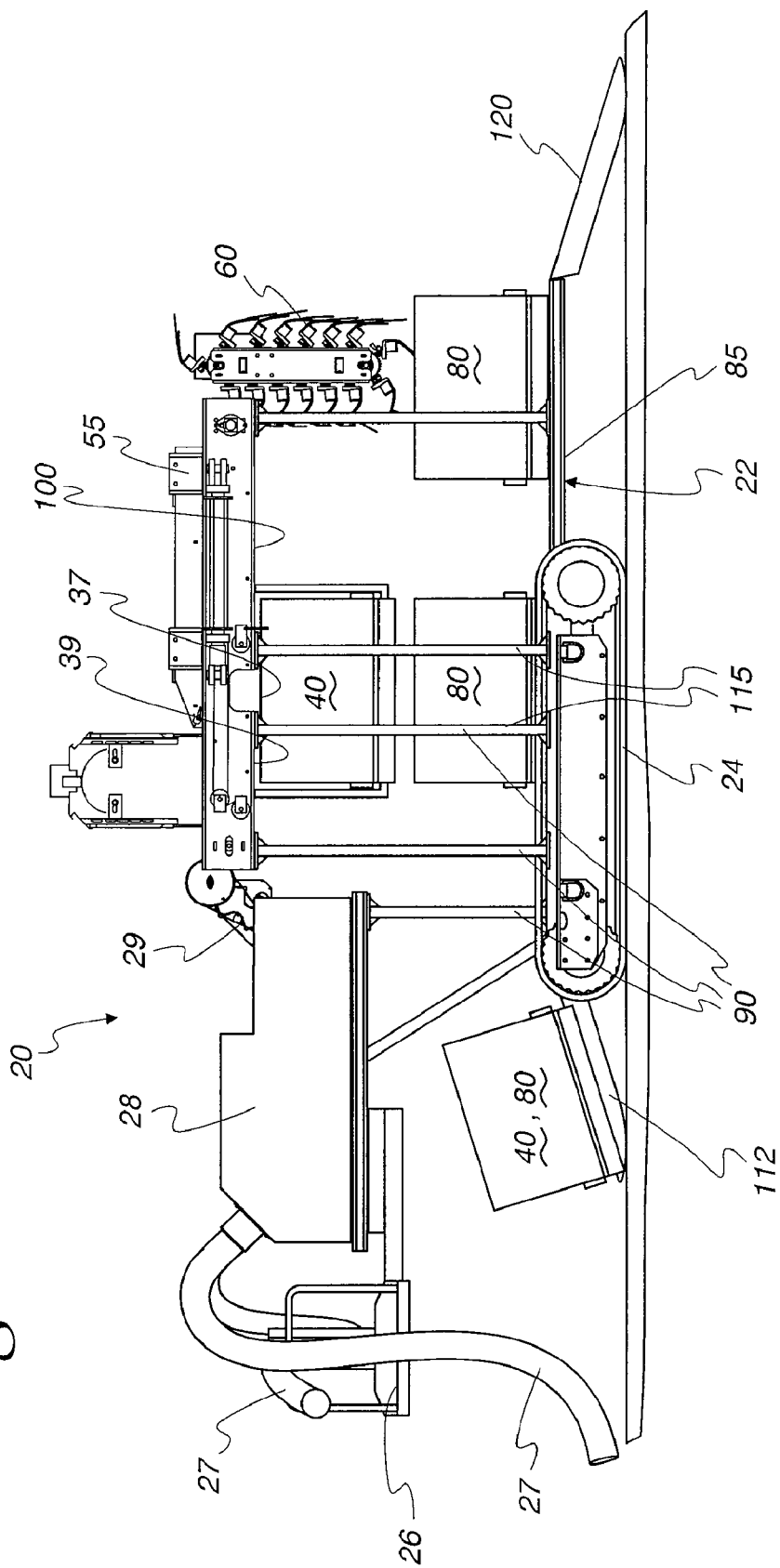
FIG. 2 is a side elevational drawing of the mobile picking system shown in FIG. 1.

Turning to FIGS. 1 and 2, there is shown a novel mobile harvesting system 20 for the picking and preliminary processing of apples, citrus, stone fruit and the like. Tomatoes, strawberries, grapes, and other discreet-object crops may also be harvested using a suitably modified version of this system. For the purposes of this description, the picking and handling of apples will be described as examples. The illustrated system comprises a chassis 22 which can be equipped with a crawler track drive and steering subsystem 24 of known design. A prime mover (not shown) such as an internal combustion engine or other power subsystem of known design can be used to power the drive and steering subsystem 24 and the other components of the mobile system 20.

Picker stations 26 are provided at the front of the vehicle chassis 22. These stations 26 can be vertically extended, vertically retracted, horizontally extended, horizontally retracted, rotated, or otherwise moved by known hydraulic or other mechanisms in order to position the picking laborers at convenient positions closely adjacent the apple trees or other trees or plants from which the human pickers are to pick apples, citrus, stone fruit or like objects.

Flexible or semi-rigid pneumatic transport tubes 27 of the sort described in Vincent E. Bryan, Jr., et al. U.S. patent application Ser. No. 12/055,209 filed Mar. 25, 2008 and entitled "Transport System For Fruit And Like Objects", now U.S. Pat. No. 7,695,220 B2 issued on Apr. 13, 2010, which is incorporated herein by reference, can be arranged so that their distal ends are attached to the picker stations 26, or the tubes can be hung from the picker's neck or waist. An intake funnel of any known sort can be hung around the picker's chest or waist. These arrangements permit the pickers to rapidly examine fruit, pick the desired fruit, and drop the picked fruit into the tubes. The productivity of the pickers will thus be increased dramatically, resulting in increased wages for the pickers and greater, better and more rapid output from the orchard. Greater orchard profits may result.

Asymmetrical objects or groups of objects such as grape clusters, tomatoes, strawberries, or other edibles can be transported by encasing them in pliable bags as disclosed in Vincent E. Bryan, Jr. U.S. provisional application Ser. No. 61/085,271 filed Jul. 31, 2008 and entitled "Device And Means To Transport Grossly Asymmetrical Objects Such As A Cluster Of Grapes Through A Pneumatic Tube", which is incorporated herein by reference.

Fruit or fruit-filled bags transported through the tubes 27 can be gently decelerated and collected in one or more water baths or other decelerating devices 28. One such device is disclosed and claimed in Randy Allard, et al. U.S. provisional application Ser. No. 61/146,468 filed Jan. 22, 2009 and entitled "Multi-Section Decelerator Tank", and Dr. Vincent E. Bryan, Jr., et al. U.S. provisional application Ser. No. 61/145, 899 filed Jan. 20, 2009 and entitled "Deceleration Tank And Extraction Conveyor", both of which are incorporated herein by reference. The collected fruit is then extracted by extraction conveyors 29 such as those described and claimed in the aforementioned Ser. No. 61/145,899 application.

The individual fruit can be conveyed by cross conveyors 30 of known design and past one or more scanning stations of known design 32, each of which includes a high-speed digital camera 35. As the fruit passes the optical cameras 35, the fruit can be rotated so that the camera 35 sees and records images of every aspect of the fruit surface. Suitable software can analyze the camera images and detect any flaws such as wormholes, bruises, blemishes, or other imperfections. The software then flags the imperfect fruit. At a subsequent or downstream diverter station 37, the imperfect fruit, referred to as culls, are diverted by known diverter mechanisms to a hopper 39 located above or within a cull holding bin 40. Known diverter mechanisms can comprise active removing devices, mechanical switches or arms, or other mechanisms. Manual cull identification and diversion could also be employed by locating culler personnel adjacent the cross conveyors 30.

Machine-induced damage to culled fruit should be minimized so that the culls can be used for sauces, juices, and other processed products. To this end, the culled objects can be handled by a hopper and bin system of the sort described and claimed in Randy Allard U.S. provisional application Ser. No. 61/146,775 filed Jan. 23, 2009 and entitled "Hopper And Bin System For Handling Apples And Like Objects" incorporated herein by reference. In general terms, culled fruit is collected in the hopper 39, and the hopper 39 can gently lower the fruit into the underlying cull bin 40.

Good, unculled apples can be routed past an optional labeling system 55. This labeling system 55 can uniquely identify groups of apples, or even individual apples, passing along the conveyor 50. This labeling will permit the orchardist and downstream 140 handlers and vendors to know the source of the apples, the time and place when and where they were picked, and other useful and valuable information.

Good, unculled apples are delivered from the conveyors 30 to one or more downloader conveyors 60. These downloader conveyors 60 gently deliver the fruit or objects to a receiving bin 80. These conveyors are described and claimed in Randy Allard, et al. U.S. provisional patent application Ser. No. 61/151,746 filed Feb. 11, 2009 and entitled "Downloader Conveyor For Apples And Like Objects", now expired in favor of U.S. patent application Ser. No. 12/703,084 filed Feb. 9, 2010 and entitled "Downloader Conveyor for Apples And Like Objects", incorporated herein by reference.

Normal harvesting procedures in orchards have receiving bins preliminarily 150 placed between the rows of trees. These bins are relatively large and heavy, and will be normally be placed by forklift trucks, forklift-equipped tractors or like known equipment before the harvest begins. When filled, the bins can hold 900 pounds or more of harvested fruits.

As suggested in FIGS. 1 and 2, the side rails 90 of the vehicle chassis 22 are set far enough apart horizontally and the upper platform 100 is set high enough to accommodate apple-receiving bins of standard dimensions so that the vehicle 20 can approach a bin, pick up the bin, straddle the bin, position and hold the bin 40 at a predetermined location relative to the chassis so as to receive apples from the cull system. Alternatively, the system can move the straddled bin to the rear of the vehicle and locate the bin 80 below the downloader conveyor in a position to receive a stream or flow of apples from the downloader conveyor until the bin is filled. The vehicle 20 will then release or drop off the filled bin behind the onwardly moving vehicle 20.

It will be understood that bins 40 and bins 80 are identical in appearance and physical aspects. Three, four, or more successive bins 80 may be filled with good or unculled apples. But when the bin 40 which happens to be used as the cull collecting bin is filled, it is lowered into a position between adjacent empty bins 80 on the bin track 85, and then that cull-filled bin 40 is dropped off behind the vehicle 20. In this way, all the culled apples are collected in a single cull bin 40. When the cull bin 40 is dropped off behind the vehicle, the bin 40 can be picked up by forklift trucks or other mechanisms 170 and delivered to an enterprise such as an applesauce maker which can make profitable use of the culled apples.

To efficiently and inexpensively accomplish these bin handling activities within and on the vehicle 20 in accordance with the invention, a set of chain conveyors 110 are provided on forwardly extending pickup forks 112. These bin moving chains 110 engage 175 the bottoms of the bins 40, 80 and pull the bins into the vehicle tunnel space created by the side rails 90 and the upper platform 100. Chassis-mounted chain conveyors 114 pull the bins from the forks 112 into a first upload position where a selected bin can be raised from the chains 114 up into the cull collecting position as suggested by the bin 40 in FIGS. 1 and 2. To accomplish this, a first bin hoist mechanism 115 can be provided on the side rails 90.

Bins which are not required to be positioned at the cull-collecting position are transported rearwardly by the chain drives 114 to be located below the downloader conveyor 60. The empty bin 80 can be hoisted upwardly by second hoist means 117 into a relatively elevated position so that the apples or other objects in the downloader 185 conveyors 60 do not freely fall in to the bin 80 but are rather gently laid in the bin as explained above. Horizontal motion of the bin 80 could be provided by appropriate equipment in the hoist mechanism 117 or by the underlying transport mechanism 85 so that a generally complete, continuous, horizontally disposed layer of apples or other objects is laid gently in the bin 80.

When a filled bin 40 or 80 arrives at the rear of the vehicle, chain drives 118 on trailing forks 120 gently lower the filled bin to the ground. The filled bins remain in their drop-off position until they are collected by forklift trucks or other devices as explained above.

The invention contemplates that the transport tubes 25, conveyors 32, 50, drop tubes 60 and other mechanisms can be removed from the chassis 22 when desired. Spraying equipment, pruning equipment and other known apparatus can be temporarily mounted on the chassis 22 so that the vehicle 20 can be used year-round in all sorts of orchard husbandry endeavors.

The invention claimed is:

1. A mobile picking system comprising, in combination, a mobile chassis having a chassis platform partially defined by a chassis front and a chassis rear;
   - a pneumatic tube transport means mounted to the platform near the chassis front, and having at least one tube for transporting picked objects;
   - an object decelerator means mounted to the mobile chassis behind the pneumatic tube transport means and having a fluid and object interface with the tube transport means, for receiving objects from the pneumatic tube transport means, the decelerator means including a water bath for receiving the transported objects;
   - a first conveyor means mounted to the mobile platform behind the decelerator means and having a front end, a back end, and an interface with the decelerator means for transporting objects from the decelerator means along a predetermined path of travel;
   - scanning means mounted to the mobile platform behind the front end of the first conveyor means and in communication with the first conveyor means for scanning objects being transported by said first conveyor means; and
   - diverting means mounted to the mobile platform behind the scanning means and in communication with the first conveyor means for diverting selected objects away from said first conveyor means predetermined path of travel.

2. A mobile picking system according to claim 1 including scanning means mounted to the platform for assessing the object in comparison to one or more predetermined parameters, wherein at least one of said parameters is selected from a parameter group including color, defect, size, and number.

3. A mobile picking system according to claim 1 further including a hopper for receiving the diverted objects.

4. A mobile picking system according to claim 3 wherein said hopper includes a mechanism for delivering objects from the hopper to a receiving bin.

5. A mobile picking system according to claim 1 further comprising a downloader conveyor mounted to the mobile chassis behind the diverter means and in communication with the first conveyor means for receiving objects from the first conveyor means and for transporting the received objects to a predetermined delivery point.

6. A mobile picking system according to claim 5 including a plurality of downloader conveyors.

7. A mobile picking system according to claim 1 including bin handling means for engaging and repositioning a bin with respect to said chassis.

8. A mobile picking system according to claim 7 wherein said bin handling means includes means for positioning said bin in a predetermined location with respect to a hopper.

9. A mobile picking system according to claim 7 wherein said bin handling means includes means for positioning said bin in a predetermined location with respect to at least one downloader conveyor.

10. A mobile picking system according to claim 1 wherein said chassis includes side rails mounting said chassis platform at an elevated position to accommodate a bin transporting means and an object receiving bin for transporting between the chassis side rails and below the chassis platform.

11. A mobile picking system according to claim 1 wherein said chassis includes a structure to at least temporarily mount one or more subsystems for assisting picking, transporting, decelerating, conveying, scanning, and delivering objects.

* * * * *